US009304520B2

(12) United States Patent
Cheng et al.

(10) Patent No.: US 9,304,520 B2
(45) Date of Patent: Apr. 5, 2016

(54) THERMAL MANAGEMENT

(75) Inventors: Chao-Wen Cheng, Taipei (TW); Edwin L. Harmon, Tomball, TX (US); Lien-Chia Chiu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

(21) Appl. No.: 13/457,927

(22) Filed: Apr. 27, 2012

(65) Prior Publication Data

US 2013/0289792 A1    Oct. 31, 2013

(51) Int. Cl.
*G05D 23/19* (2006.01)
*G06F 1/20* (2006.01)
*G06F 1/16* (2006.01)

(52) U.S. Cl.
CPC .......... *G05D 23/1919* (2013.01); *G06F 1/1684* (2013.01); *G06F 1/206* (2013.01)

(58) Field of Classification Search
None
See application file for complete search history.

(56) References Cited

U.S. PATENT DOCUMENTS

| | | | | |
|---|---|---|---|---|
| 6,134,667 | A * | 10/2000 | Suzuki et al. ................. | 713/300 |
| 6,255,622 | B1 | 7/2001 | May et al. | |
| 6,457,132 | B1 * | 9/2002 | Borgendale et al. .......... | 713/320 |
| 6,542,846 | B1 * | 4/2003 | Miller et al. .................. | 702/132 |
| 6,654,895 | B1 * | 11/2003 | Henkhaus et al. ............. | 713/320 |
| 6,671,175 | B1 * | 12/2003 | Chen ............................. | 361/715 |
| 6,987,370 | B2 | 1/2006 | Chheda et al. | |
| 7,275,170 | B2 * | 9/2007 | Suzuki .......................... | 713/340 |
| 8,341,433 | B2 * | 12/2012 | Artman et al. ................ | 713/300 |
| 2004/0228091 | A1 * | 11/2004 | Miyairi ......................... | 361/695 |
| 2005/0030171 | A1 * | 2/2005 | Liu et al. ....................... | 340/500 |
| 2005/0060659 | A1 * | 3/2005 | Verdun et al. ................. | 715/772 |
| 2005/0212781 | A1 * | 9/2005 | Clapper ......................... | 345/184 |
| 2005/0289372 | A1 * | 12/2005 | Park .............................. | 713/300 |
| 2007/0027580 | A1 | 2/2007 | Ligtenberg et al. | |
| 2008/0181433 | A1 * | 7/2008 | Thomas et al. ............... | 381/94.5 |
| 2008/0184047 | A1 * | 7/2008 | Goeltzenleuchter .......... | 713/320 |
| 2009/0281642 | A1 | 11/2009 | Ady et al. | |
| 2009/0296342 | A1 * | 12/2009 | Matteson ................. | G06F 1/206 361/679.46 |
| 2010/0118486 | A1 * | 5/2010 | Su ................................ | 361/679.48 |
| 2010/0194321 | A1 * | 8/2010 | Artman ..................... | G06F 1/206 318/454 |
| 2011/0224901 | A1 * | 9/2011 | Aben ........................ | G01C 21/32 701/532 |
| 2011/0251733 | A1 * | 10/2011 | Atkinson et al. .............. | 700/300 |
| 2013/0040631 | A1 * | 2/2013 | Truskovsky ............ | H04M 1/72577 455/420 |
| 2013/0096720 | A1 * | 4/2013 | Brey et al. .................... | 700/276 |

* cited by examiner

*Primary Examiner* — Christopher E Everett

(74) *Attorney, Agent, or Firm* — Mahamedi Paradice Kreisman

(57) ABSTRACT

An operation mode is determined based on user behavior data, an environmental data of the electronic device is determined and a system operating data of the electronic device is determined. A system control parameter can be adjusted based on the environmental data and the system operating data to regulate the heat generating element and/or the cooling element to achieve the operating mode.

17 Claims, 4 Drawing Sheets

THERMAL MANAGEMENT

DESCRIPTION OF THE RELATED ART

Computers and other electronic devices contain numerous electronic components such as processors, memory and graphics products, and other integrated circuits (ICs) that give off heat. Electronic components are heat-sensitive and may malfunction or become physically damaged if the components become too hot. Furthermore, the heat dissipation problem may be an issue in portable electronic devices, such as laptop computers or notebook computers, which are often used in close proximity to users and handled by the users. When a notebook computer dissipates heat, the case temperature of a notebook computer can becomes uncomfortable or unsafe for the users. Thus, system level cooling elements as well as component level cooling elements that are attached to individual ICs within an electronic device are vital to the functionality of many electronic devices. These cooling elements may be heat spreaders, fans, blowers, heat sinks, and others. Some of the cooling elements can be controlled by a thermal control system that is part of the electronic device. For example, a cooling fan can be controlled to operate at varying speeds.

DETAILED DESCRIPTION OF THE PREFERRED EMBODIMENTS

Thermal control systems may be controllable based on the temperature of the components, such as integrated circuits, that they cool. For example, a fan's speed may be increased if a particular ICs temperature rises to an undesirable level. Thermal control systems that are controllable based on other environmental factors, such as ambient noise and ambient temperature have also been described. However, thermal management techniques based on system or component temperature and thermal management techniques applied to maintain system or component temperature are sometimes inefficient and may lead to unsatisfactory user experience.

In examples of the present invention, a control system and method for an electronic device implement dynamic thermal management to select an operation mode based on user behavior and environmental and operation factors. The control system and method implement a control policy that uses user behavior data in conjunction with environmental and system operation data to adjust the performance of the electronic device to optimize individualized user experience. In this manner, the control system and method individualize the electronic device so that the user perceives that the electronic device is operating in accordance with his/her own personal preferences. In a way, the control system humanizes the electronic device by making the electronic device conforms to specific usage "behavior and habit" of each individual user. In the following description, various embodiments will be described below by referring to several examples.

Figure 1:
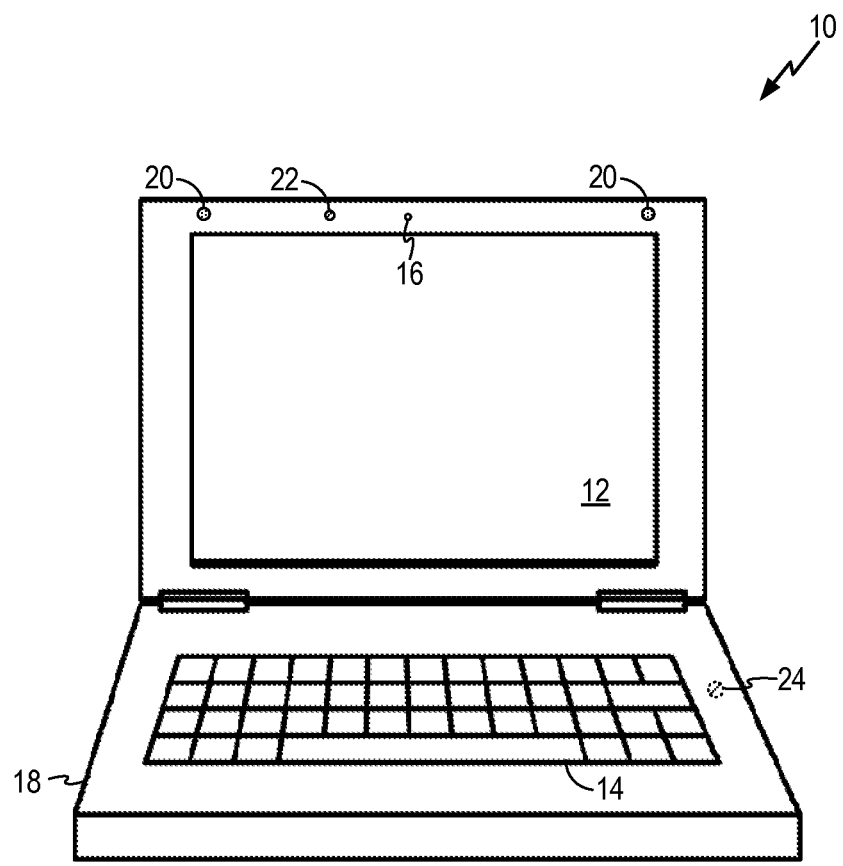
FIG. 1 is a perspective drawing of an electronic device, depicted here as a notebook computer, implementing the control system in examples of the present invention.

In one example, the control system is implemented in a computing device, such as a notebook computer. FIG. 1 is a perspective drawing of an electronic device, depicted here as a notebook computer, implementing the control system in one example. Referring to FIG. 1, notebook computer 10 has a case 18 containing input devices and output devices. The input devices can include a keyboard 14 and a touchpad (not shown). One output device shown is a display 12. The notebook computer 10 may include a camera 16 arranged on a top edge of the display 12. Within the case 18, the notebook computer 10 contains circuits (not shown) for receiving input data from the input devices, processing the input data and displaying data on the display 12. The notebook computer 10 may also receive input data from a network cable (not shown). The circuits of notebook computer 10 may include a central processing unit (CPU), a memory circuit, a graphics device, or a battery charge circuit, or combination thereof that consume energy and dissipate heat in operation. The circuits of notebook computer 10, such as integrated circuits (ICs), are heat-sensitive and may malfunction or become damaged if the ICs become too hot. Notebook computer 10 may include cooling elements, such as heat sinks, heat pipes, heat spreaders, or a fan, to dissipate the heat generated by the integrated circuits.

In some examples, notebook computer 10 implements a control system to maintain the temperature of the internal circuits to within a safe operating range. For example, the control system may regulate the fan's speed to increase cooling when the temperature is over a threshold. Alternately, the control system may regulate the processor's speed to reduce heat generation. In some examples, the control system for notebook computer 10 implements a dynamic thermal management control policy to modify the performance of the notebook computer based on user behavior and environmental and system operation factors. The control system may be implemented in the processor of the notebook computer and may include hardware and/or software components. In other examples, the control system may be implemented as a controller in an electronic device and may include hardware and/or software components.

The notebook computer 10 is equipped with sensors to collect various environmental and system operation data. More specifically, the notebook computer 10 may be equipped with one or more sensors for detecting one or more environmental conditions. In the present description, environmental conditions refer to the ambient conditions that are present in the external vicinity of the electronic device and not the conditions inside the electronic device. On the other hand, system operating conditions refer to the conditions that are present inside the electronic device. In the present description, environmental data refers to the data associated with the environmental conditions and also the system operating conditions of the electronic device.

In the example shown in FIG. 1, notebook computer 10 is equipped with a microphone array 20 to detect an ambient noise level. Notebook computer 10 may further be equipped with a temperature sensor 22 to detect ambient temperature. The microphone array 20 and the temperature sensor 22 may be located at a location away from noise-generating or heat generating components of the notebook computer, such as being placed along the top of the display 12.

In the example shown in FIG. 1, notebook computer 10 is further equipped with a case temperature sensor 24 to measure the skin temperature of case 18. The case temperature sensor 24 can be provided on the internal side of case 18 or on the exposed side of case 18. The notebook computer 10 may further be equipped with one or more component temperature sensors to measure the temperature of the integrated circuits of the notebook computer.

In the present example, the control system implemented in notebook computer 10 further collects system operation data including, but not limited to, the amount of system power dissipation, battery charging rate, DRAM memory bandwidth, display brightness setting, processor power consumption level, display power consumption level.

To realize individualized user experience, the control system further collects user behavior data. In the present description, user behavior data includes user preference information, user usage information and user experience history data. User preference information may be related to the performance level desired by the user for certain tasks. For example, a user using the notebook computer for gaming may desire a high performance level than when the notebook computer is being used for word processing. User usage information may be related to the usage pattern of the notebook computer or the actual usage the computer is currently being put under. For example, user usage information may include the event schedule of the user, such as when the user may be in a class or a meeting. User usage information may include the regular work hours of the user, such as Mondays to Fridays from 9 AM to 5 PM. User experience history data, collected by the control system, is indicative of the user's usage pattern and the associated performance level of the notebook computer. The control system uses the user experience history data to aid in determining what performance level the user desires when the user is performing certain tasks. The control system may provide an interface for a user to enter the user's selected preferences.

The control system receives the environmental data and the system operation data as well as the user behavior data to regulate the operation of the notebook computer to optimize the user experience for the user. For example, the noise level, the skin temperature of the case and the performance level of the processor are regulated to provide an individualized user experience. In one example, the control system operates automatically to collect the environmental data and the system operation data as well as user behavior data and to determine the optimal operation mode for the electronic device based on the collected data. The control system may operate without input from the user, except for selecting user preference information.

In some examples, the control system determines system control parameters based on the user behavior data and the environment and system operation data to implement dynamic thermal management. The control system may apply a control policy to control heat generating and heat dissipating components of the notebook computer, such as the speed of the fan, the speed of the processor, the battery usage and charging operation, the brightness level of the display, and others.

In one example, the control system implements multiple system operation modes and selects the desired system operation mode based on the collected user behavior data and the environment and system operation data. In some example, the control system may provide an interface to enable the user to select a desired system operation mode. In some examples, the system operation modes may include: a high performance mode, a silent mode, a battery mode and a skin temperature mode.

The high performance mode is selected when the user behavior data indicates that the user desires a high performance level from the processor. The control system configures the notebook computer to deliver a high performance level to the user, such as high processor speed while operating the thermal management control parameters to maintain the system temperature to within the acceptable range. The high performance mode may be related to high noise level (such as due to high fan speed), high skin temperature and short battery life. However, the control system detects the ambient noise level and may dynamically adjust the fan speed in view of the ambient noise level. The control system may further detect the ambient temperature to calculate the thermal resistance and may dynamically adjust the thermal management parameters in view of the surrounding temperature to maintain a desirable skin temperature for the case of the electronic device.

The silent mode is selected when the user behavior data indicates that the user desires a quiet operation from the notebook computer. In that case, the control system configures the notebook computer to achieve a noise level that is comparable to the ambient noise level so that the noise from the notebook computer would not be noticeable to the user. The ambient noise level may be detected by the microphone array of the notebook computer. For example, the control system may adjust the fan speed, the optical disk drive speed, the hard disk drive speed, and any other moving parts of the notebook computer to reduce the noise level to the ambient noise level. The control system may further detect the ambient temperature and calculate the thermal resistance at certain fan speed to determine the best thermal management settings. The silent mode may be related to a low performance level in order to reduce heat generation from the circuits of the notebook computer.

The battery mode is selected when system operating data indicates that notebook computer is running on battery power only and the user behavior data indicates that a long battery life is desired. In that case, the control system configures the notebook computer with energy saving control parameters to achieve the longest battery life. For example, the control system may determine from a calendar application on the electronic device that the user is in a long meeting. The control system may then automatically configure the electronic device to operate in the battery mode to prolong battery life so that the user has sufficient battery power to last for the entire meeting.

The skin temperature mode is selected when the user behavior data indicates certain desired skin temperature for the case of the notebook computer. The control system regulates the system control parameters to achieve the desired skin temperature. The control system may adjust the system control parameters based on the ambient temperature. For example, the skin temperature of the case may be allowed to be warm when the ambient temperature is colder and the skin temperature of the case is kept cooler when the ambient temperature is warmer.

In operation, the control system adjusts the system control parameters to individualize the notebook computer for the individual user. For example, when the user behavior data indicates that the user engages in computer gaming, the control system will select the high performance mode. The user may not mind the higher skin temperature or higher noise level in exchange for faster processor speed. On the other hand, when the user behavior data indicates that the user is an office worker or is working in a quiet environment, the control system will select the silent mode for optimal noise level or the battery mode for longer battery life. The user may not need the highest level of processor performance for word processing or Internet research tasks.

In another example, the control system may operate in the skin temperature mode to adjust the skin temperature of the case to cooler temperature during the user's regular work day, such as Monday to Friday. The control system may allow the skin temperature to increase during the weekend when the user is not using the notebook computer for work.

In yet another example, the control system may operate in the silent mode when the control system determines that the user is having a meeting or attending a conference. The control system will adjust the system control parameters so that noise generated by the notebook computer is comparable to the background noise and is not noticeable over the background noise.

Figure 2:
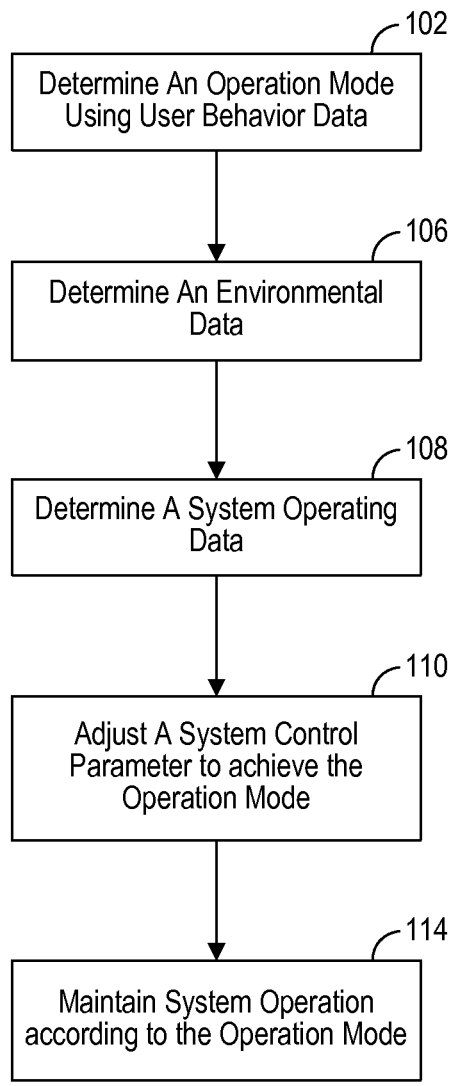
FIG. 2 is a flow chart of a control method in an electronic device for dynamically controlling system performance to optimize user experience in examples of the present invention.

FIG. 2 is a flow chart of a control method in an electronic device for dynamically controlling system performance to optimize user experience in one example. Referring to FIG. 2, a control method 100A starts by determining an operation mode based on user behavior data (block 102). The control method 100A then determines environmental data based on the environmental and system operating conditions of the electronic device (block 106). For example, the control method 100A may detect the ambient noise level and the ambient temperature. The control method 100A further determines system operating data (block 108). For example, the control method 100A may determine the fan speed, the processor speed, the battery life, the display brightness, the system power dissipation level of a notebook computer. The control method 100A then adjusts a system control parameter to achieve the operation mode at the electronic device (block 110). The control method 100A operates to maintain system operation according to the operation mode (block 114).

Figure 3:
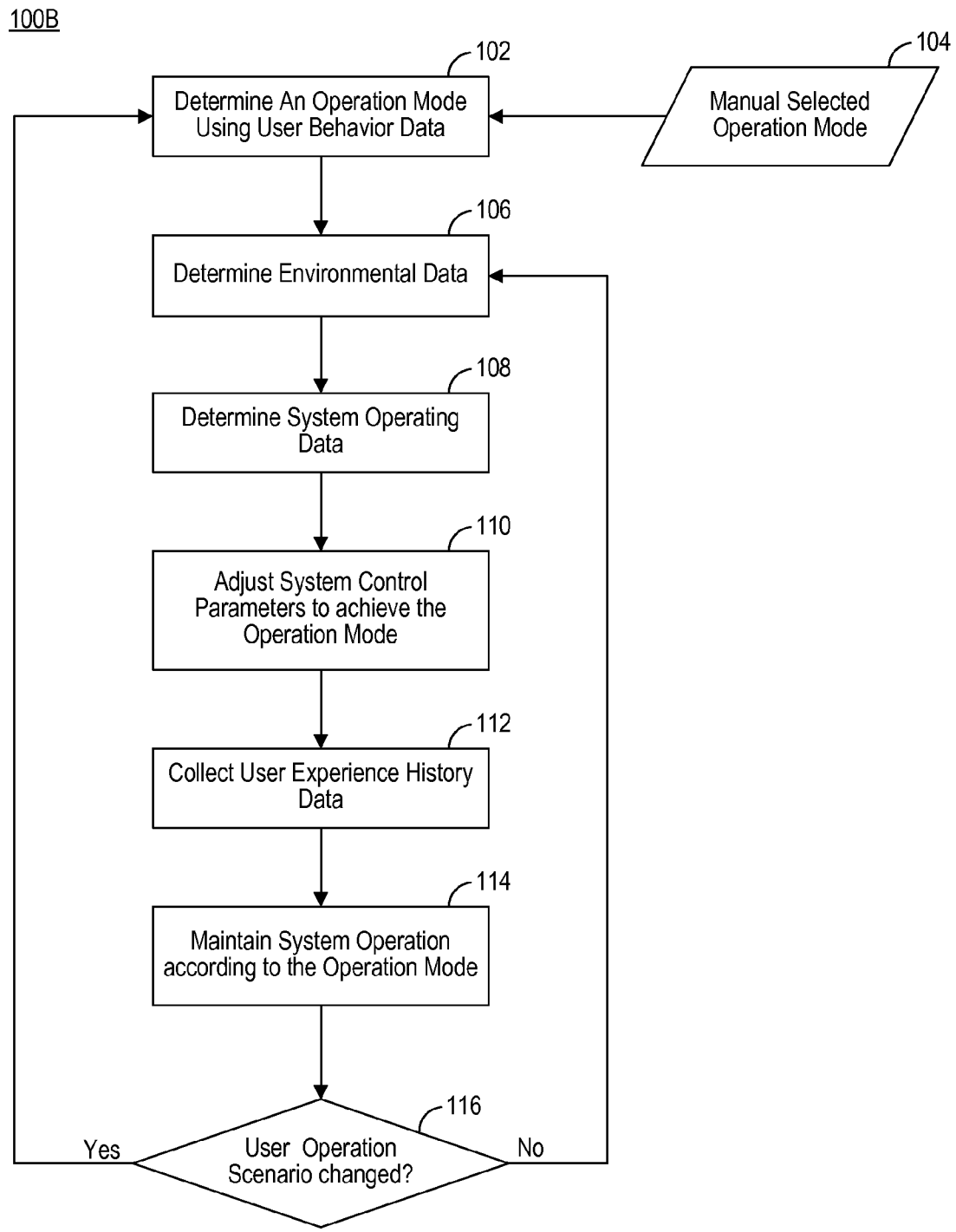
FIG. 3 is a flow chart of a control method in an electronic device for dynamically controlling system performance to optimize user experience in other examples of the present invention.

FIG. 3 is a flow chart of a control method in an electronic device for dynamically controlling system performance to optimize user experience in one example which is a variation of the control method in FIG. 2. Referring to FIG. 3, a control method 100B starts by determining an operation mode based on user behavior data (block 102). The control method 100B may also accept a manually selected operation mode (block 104). The control method 100B then determines environmental data based on the environmental and system operating conditions of the electronic device (block 106). For example, the control method 100B may detect the ambient noise level and the ambient temperature. The control method 100B further determines system operating data (block 108). For example, the control method 100B may determine the fan speed, the processor speed, the battery life, the display brightness, the system power dissipation level of a notebook computer. The control method 100B then adjusts the system control parameters to achieve the operation mode at the electronic device (block 110). The control method 100B may further collect user experience history data (bock 112). User experience history data, collected by the control system, is indicative of the user's usage pattern and the associated performance level of the notebook computer.

The control method 100B operates to maintain system operation according to the operation mode (block 114). The control method determines if the operation mode has changed (block 116). If not, the method repeats at block 106 where the control method 100B continues to collect the environmental data and the system operating data of the electronic device. If the operation mode has changed, the control method 100B repeats at block 102 to determine the operation mode based on user behavior data.

The control method 100B as thus operated realizes dynamic thermal management control whereby the electronic device is operated at a desired operating scenario for the user's preference without sacrificing system performance. In one example, the control method 100B operates automatically without requiring user input.

Figure 4:
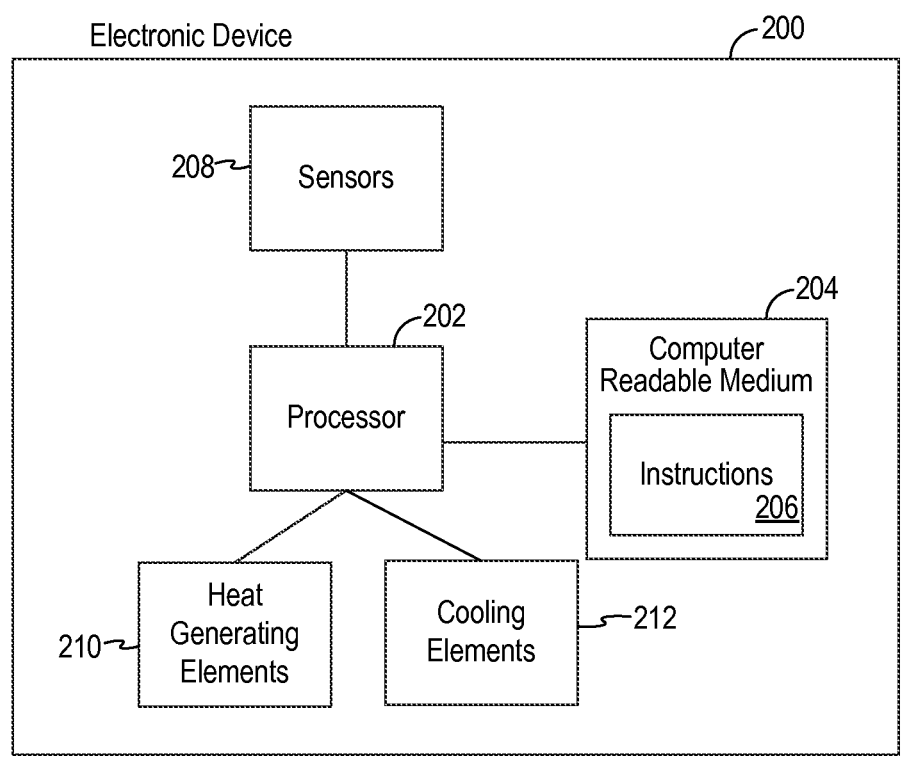
FIG. 4 is a block diagram of an electronic device according to examples of the present invention.

FIG. 4 is a block diagram of an electronic device in one example. Referring to FIG. 4, an electronic device 200 includes a processor or controller 202 in communication with one or more sensors 208, one or more heat generating elements 210 and one or more cooling elements 212. The electronic device 200 includes a computer readable medium 204 including instructions 206 that, when executed by the processor 202 of the electronic device, cause the processor 202 to: determine an operation mode based on user behavior data; determine an environmental data of the electronic device; determine a system operating data of the electronic device; adjust a system control parameter based on the environmental data and the system operating data to regulate the heat generating element and/or the cooling element to achieve the operating mode; and maintain system operation according to the operation mode.

The above detailed descriptions are provided to illustrate specific embodiments of the present invention and are not intended to be limiting. Numerous modifications and variations within the scope of the present invention are possible. The present invention is defined by the appended claims.

We claim:

1. A method for dynamic thermal management of an electronic device operable in a high performance mode, a silent mode, and a skin temperature mode, the method performed by one or more processors of the electronic device and comprising:
    collecting user behavior data corresponding to user interactions performed on the electronic device to select one of the high performance mode, the silent mode, or the skin temperature mode for the electronic device;
    using a number of sensors of the electronic device, measuring a number of environmental conditions of the electronic device;
    collecting system operating data of the electronic device, the system operating data corresponding to usage of operational components of the electronic device; and
    in response to a selection of the skin temperature mode, (i) determining an ambient temperature external to the electronic device, and (ii) dynamically adjusting performance of the operational components and cooling elements of the electronic device to maintain a skin temperature of a case of the electronic device based on the ambient temperature.

2. The method of claim 1, wherein the cooling elements include one or more fans, and wherein selection of the high performance mode causes the electronic device to dynamically adjust a fan speed of the one or more fans to increase cooling in response to an increased processing speed of the electronic device.

3. The method of claim 2, wherein the selection of the high performance mode further comprises detecting an ambient noise level and a skin temperature of the electronic device, and wherein dynamically adjusting the fan speed of the one or more fans comprises optimizing the ambient noise level versus the skin temperature while maintaining the increased processing speed.

4. The method of claim 1, wherein the operational components and the cooling elements of the electronic device comprise one or more fans, an optical disk drive, and a hard disk drive, the method further comprising:

in response to a selection of the silent mode, monitoring an ambient noise level of the electronic device using a microphone array of the electronic device; and dynamically adjusting each of a fan speed of the one or more fans, an optical disk drive speed of the optical disk drive, and a hard disk drive speed of the hard disk drive to maintain the ambient noise level below a predetermined level.

5. The method of claim 1, further comprising:
identifying that the electronic device is in a battery mode, in which the electronic device operates only on battery power.

6. The method of claim 5, further comprising:
determining, from a calendar application on the electronic device, that the user will not use the electronic device for a duration of time; and
initiating energy saving control parameters on the operational components and the cooling elements of the electronic device to achieve a maximum battery life for the electronic device.

7. The method of claim 1, wherein the electronic device comprises a notebook computer.

8. The method of claim 1, further comprising:
in the skin temperature mode, based on the ambient temperature being below a threshold, adjusting the performance of one or more of the operational components and one or more of the cooling elements to maintain an increased skin temperature as compared to a normal operating skin temperature.

9. The method of claim 1, wherein collecting the system operating data of the electronic device comprises determining one or more of a system power dissipation level, a battery charging rate, a DRAM memory bandwidth, a display brightness setting, a processor power consumption level, or a display power consumption level.

10. The method of claim 1, further comprising:
in the skin temperature mode, based on the ambient temperature being above a threshold, adjusting the performance of one or more of the operational components and one or more of the cooling elements to maintain a decreased skin temperature as compared to a normal operating skin temperature.

11. The method of claim 1, wherein dynamically adjusting the performance of the operational components comprises regulating a speed of a microprocessor in the electronic device.

12. An electronic device comprising:
an input device;
a display;
a number of sensors;
a processor; and
a memory resource storing instructions for dynamic thermal management of the electronic device operable in a high performance mode, a silent mode, and a skin temperature mode, wherein the instructions, when executed by the processor, cause the processor to:
collect user behavior data corresponding to user interactions performed on the electronic device to select one of the high performance mode, the silent mode, or the skin temperature mode for the electronic device;
using the sensors, measure a number of environmental conditions of the electronic device;
collect system operating data of the electronic device, the system operating data corresponding to usage of operational components of the electronic device; and
in response to a selection of the skin temperature mode, (i) determine an ambient temperature external to the electronic device, and (ii) dynamically adjust performance of the operational components and cooling elements of the electronic device to maintain a skin temperature of a case of the electronic device based on the ambient temperature.

13. The electronic device of claim 12, wherein collecting the system operating data of the electronic device comprises determining one or more of a system power dissipation level, a battery charging rate, a DRAM memory bandwidth, a display brightness setting, a processor power consumption level, or a display power consumption level.

14. A non-transitory computer-readable storage medium comprising instructions for dynamic thermal management of a computing device operable in a high performance mode, a silent mode, and a skin temperature mode, wherein the instructions, when executed by a processor of the computing device, cause the processor to:
collect user behavior data corresponding to user interactions performed on the computing device to select one of the high performance mode, the silent mode, or the skin temperature mode for the computing device;
using a number of sensors of the computing device, measure a number of environmental conditions of the computing device;
collect system operating data of the computing device, the system operating data corresponding to usage of operational components of the computing device;
in response to a selection of the skin temperature mode, (i) determine an ambient temperature external to the electronic device, and (ii) dynamically adjust performance of the operational components and cooling elements of the electronic device to maintain a skin temperature of a case of the electronic device based on the ambient temperature.

15. The non-transitory computer-readable storage medium of claim 14, wherein the cooling elements include one or more fans, and wherein a selection of the high performance mode causes the computing device to dynamically adjust a fan speed of the one or more fans to increase cooling in response to an increased processing speed of the computing device.

16. The non-transitory computer-readable storage medium of claim 15, wherein the selection of the high performance mode further comprises detecting an ambient noise level and a skin temperature of the computing device, and wherein dynamically adjusting the fan speed of the one or more fans comprises optimizing the ambient noise level versus the skin temperature while maintaining the increased processing speed.

17. The non-transitory computer-readable storage medium of claim 14, wherein the operational components and the cooling elements of the computing device comprise one or more fans, an optical disk drive, and a hard disk drive, and wherein the executed instructions further cause the processor to:
in response to a selection of the silent mode, monitor an ambient noise level of the computing device using a microphone array of the computing device; and
dynamically adjust each of a fan speed of the one or more fans, an optical disk drive speed of the optical disk drive, and a hard disk drive speed of the hard disk drive to maintain the ambient noise level below a predetermined level.

\* \* \* \* \*